US005203534A

United States Patent [19]

Demarest et al.

[11] Patent Number: 5,203,534

[45] Date of Patent: Apr. 20, 1993

[54] FLUID CONTROL VALVE

[75] Inventors: Scott W. Demarest, Caledonia; James E. Buhler, Waterford; Allen D. Miller, Mt. Pleasant, all of Wis.

[73] Assignee: S. C. Johnson & Son, Inc., Racine, Wis.

[21] Appl. No.: 629,517

[22] Filed: Dec. 18, 1990

[51] Int. Cl.[5] .......... F16K 7/04; F16K 24/04

[52] U.S. Cl. .......... 251/7; 251/10; 251/127; 222/479

[58] Field of Search .......... 251/4, 6, 7, 9, 10, 251/126, 127; 222/479; 220/374, 373, 360, 204, 202; 215/308, 311

[56] References Cited

U.S. PATENT DOCUMENTS

| | | | |
|---|---|---|---|
| 2,356,865 | 8/1944 | Mason | 251/9 X |
| 3,539,081 | 11/1970 | Norton | 251/9 X |
| 4,129,231 | 12/1978 | Larson | 251/9 X |
| 4,588,159 | 5/1986 | Kawai et al. | 251/4 |
| 4,667,924 | 5/1987 | Speidel | 251/7 X |
| 4,690,375 | 9/1987 | Vorhis | 222/490 |
| 4,769,004 | 9/1988 | Poindexter | 251/4 X |
| 4,821,364 | 4/1989 | McAllister et al. | 15/321 |
| 4,903,935 | 2/1990 | Mrugala et al. | 251/4 X |
| 4,911,336 | 3/1990 | Blake | 222/321 |
| 4,921,017 | 5/1990 | Tada | 137/843 |

FOREIGN PATENT DOCUMENTS

| | | | |
|---|---|---|---|
| 1127545 | 9/1960 | France | 251/9 X |
| 1230537 | 5/1961 | France | 251/9 X |

OTHER PUBLICATIONS

Applicants' co-pending Appln. Ser. No. 07/599,179, "Fluid Spray Device", filed Oct. 17, 1990.

*Primary Examiner*—Richard A. Bertsch
*Assistant Examiner*—Kevin L. Lee

[57] ABSTRACT

A fluid control valve which has a deformable valve member with a fluid passageway therethrough. The fluid passageway is closed by a pressure-exerting member. Initial actuation of the valve by pressure on an actuator assembly compresses a spring which moves the pressure-exerting member away from the deformable valve member, thus allowing the fluid passageway to open. The fluid control valve also having a base portion containing a tortuous path air channel. When the base portion is fitted against a neck plug of a reservoir, a vent opening in the neck plug opens into the air channel of the base, allowing air to enter the reservoir while preventing liquid from leaking out of the reservoir should the reservoir be tipped over.

3 Claims, 4 Drawing Sheets

FLUID CONTROL VALVE

TECHNICAL FIELD

This invention relates to the field of valves for controlling the flow of a fluid and more particularly to an extremely simplified valve assembly that has a fluid passageway in a deformable member which is held in either a closed or an open position until pressure is applied, to apply pressure either opening or closing the fluid passageway.

BACKGROUND ART

While it is known that pinching a hose can interrupt the flow of water through a garden hose, valving for fluid control is usually much more complicated. Many fluid control devices are made from moving parts that are basically rigid, to avoid the problems of stress breakdown that can occur after multiple uses of a deformable valve member. However, such devices tend to be relatively heavy and complicated. Examples of this type are the well-known screw-down faucet type of control valve.

An example of a moveable rigid-member closure system is given by U.S. Pat. No. 4,911,336 to Blake, "Valve With Interchangeable Components", which discloses a valve with a poppet member reciprocally moveable within a cylinder.

Other valve systems may employ materials that work by deformation. An example of such a check valve in U.S. Pat. No. 4,921,017 to Tada, "Check Valve", which discloses a valve with a plurality of deformable plastic blades which seal the fluid passageway when they are seating against a valve seat by pressure U.S. Pat. No. 4,821,364 to McAllister et al., "Fluid Control Valve", discloses a valve having a fluid passageway that is closed off by direct pressure applied to an elongated bar having an angle bend. When the bar is straightened by the pressure, it elongates, thus closing the fluid passageway.

Examples of deformable fluid conduits closeable by pressure are given in: U.S. Pat. No. 4,769,004 to Poindexter, Flexible Tubing Clamp and Method of Use", which discloses a clamp having slide portions of clamping off a flexible tube intended for insertion in a human stomach; and U.S. Pat. No. 4,588,159 to Kawai et al., "Pinch Valve Device" which discloses a valve having a pair of nipping portions which, when brought together, close off a resilient tube.

U.S. Pat. No. 4,903,935 to Mrugala et al., "Bottled Water Cooler with Improved Valve Construction", which discloses, among other things, a valving system in which force applied to a lever relieves the pinching force on a section of tubing and thus opens the tube to fluid flow, the tube being normally biased closed.

SUMMARY DISCLOSURE OF THE INVENTION

For applications that do not require great pressure-resistance and should preferably be light, simple and therefore both inexpensive and easy to manufacture, a well-designed deformable valving assembly is ideal.

The present invention presents a fluid control valve that meets the desired criteria. It has few moving parts and those are extremely simple, making it economical to produce. The design of the fluid channel itself allows closure with relatively low pressure, and has proven to hold up well under repeated openings and closings.

A further advantage of the fluid control valve is that it will operate in any orientation.

The present invention provides a simple yet effective valve which is normally held closed, preventing fluid flow, until it is actuated. The valve has a deformable member made of elastomeric material with a fluid passageway, which has an oval-shaped cross-section, extending therethrough. The deformable member sits within a carrier structure. A pressure bar connected to the actuator button is spring-biased against the deformable member, thus deforming and closing the fluid passageway. When the actuator button is depressed, the spring is compressed against the outer housing of the valve and the pressure bar is forced away from its contact with the deformable member, which allows the fluid passageway to open and fluid may then pass therethrough.

BEST MODE FOR CARRYING OUT THE INVENTION

Figure 1:
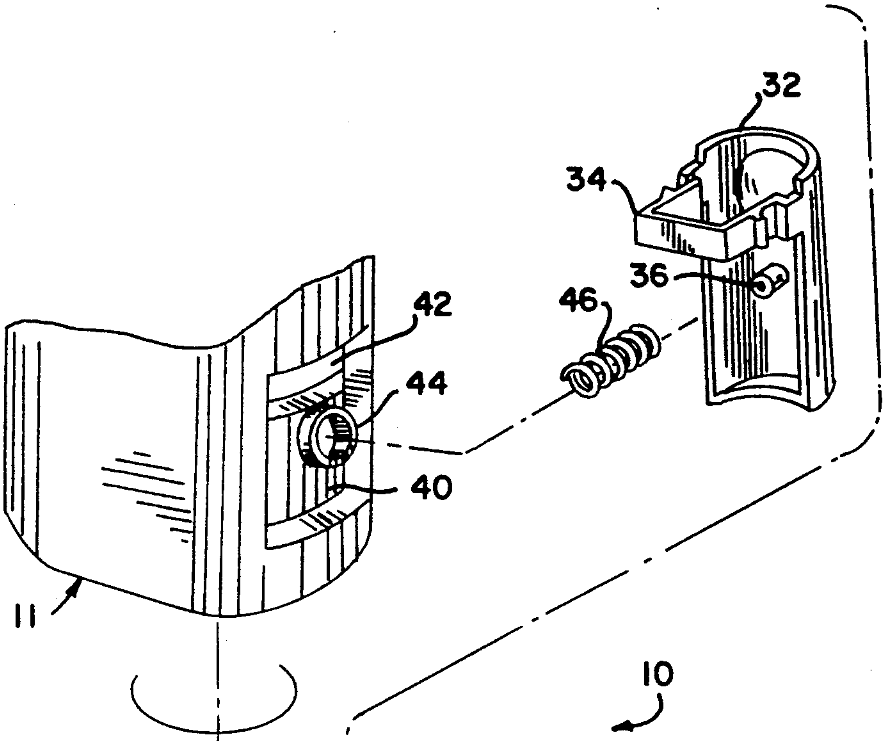
FIG. 1 is an exploded perspective view of the valve assembly.
Figure 1:
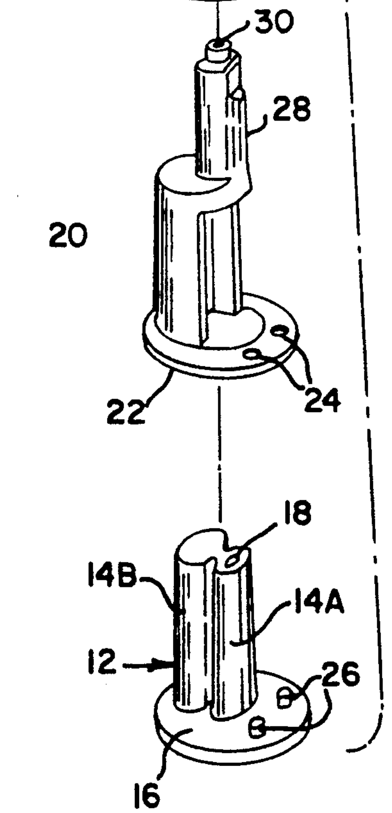

Throughout the Figures, like reference numerals refer to like parts. For clarity, parts of similar function in the second embodiment of the invention are designated with an "a" after the reference number.

FIGS. 1 through 4 depict a preferred embodiment of the fluid control valve of the present invention. A concrete example of the use of this valve in a small, manually operated sprayer is disclosed in applicants' co-pending application, "Fluid Spraying Device", filed Oct. 17, 1990.

FIG. 1 is an exploded and partially rotated perspective view of fluid control valve 10 showing a partial view of housing 11 into which the valve assembly is fitted.

Fluid control valve 10 has deformable valve member 12 which has first elongated valve body portion 14A and second elongated valve body portion 14B and valve base 16. Extending through first elongated valve body portion 14A of deformable valve member 12 is valve fluid passageway 18, which has an oval-shaped cross-section, a configuration which was found to provide better flexibility and resiliency in use. Second elongated valve body portion 14B provides resilient support for first elongated valve body portion 14A, acting as a spring to aid fluid passageway 18 to resume its open configuration after being deformed to the closed position. Situated upon valve base 16 of deformable valve member 12 are valve body projections 26.

Fluid control valve 10 further has valve carrier 20, which has the overall shape of a hollow cylinder, partially opened along one side, and designed to accept first and second elongated valve body portions 14A and 14B, with valve carrier base flange 22 around its open lower end. Valve carrier base flange 22 has therethrough a pair of carrier base holes 24 designed to accept correspondingly formed valve body projections 26. The upper end of valve carrier 20 is tubular structure 28 which has therethrough carrier fluid passageway 29 (shown in FIGS. 3 and 4). Tubular structure 28 ends in fluid discharge orifice 30.

When deformable valve member 12 is fitted into valve carrier 20, valve body projections 26 fit snugly into carrier base holes 24 and hold the two parts together in the correct operational orientation. The side of deformable valve member 12 containing valve fluid passageway 18 is exposed through the open side of valve carrier 20. While this embodiment of the fluid control valve utilizes a separate carrier for the deformable valve member, it would also be possible to form the carrier portion into and as part of the housing assembly.

Fluid control valve 10 also has actuator button assembly 32, which has, on one side thereof, pressure bar 34 and actuator spring retainer 36. Pressure bar 34 has, along its inner or containing side, pressure point 35 (visible in FIGS. 3 and 4) which serves to localize the pressure exerted by pressure bar 34 upon deformable valve member 12.

Actuator button assembly 32 fits against and into housing 11, which is partially shown in FIG. 1. The particular configuration of housing 11, with the exception of the portion shown which has structure essential to the operation of the valve, will depend upon the type of fluid transfer device or environment in which the valve is to be used.

Housing 11 has actuator seat area 40, pressure bar slot 42, and housing spring acceptor 44. Coil spring 46 is sized to fit over actuator spring retainer 36 and within housing spring acceptor 44. Other biasing means, such as different types of springs or electromechanical devices, may also be used to control the operation of pressure bar 34.

Fluid control valve 10 is assembled as follows: coil spring 46 is placed upon either actuator spring retainer 36, or housing spring acceptor 44 and actuator button assembly 32 is positioned over actuator seat area 40 in such a way that pressure bar 34 extends through pressure bar slot 42 into the interior of housing 11. Then the preassembled valve member and carrier assembly is inserted into housing 11 between the inside surface of housing 11 and pressure bar 34. Valve carrier 20 is so oriented that the exposed side of deformable valve member 12 which contains valve fluid passageway 18 faces pressure bar 34.

In this position, coil spring 46 biases actuator button assembly 32 away from the surface of housing 11 and pressure bar 34 is pulled against the exposed portion of deformable valve member 12 containing valve fluid passageway 18. Valve fluid passageway 18 is deformed to a flattened or closed position by this pressure, making "closed" the normal, non-actuated position for fluid control valve 10.

When a user presses on the outside surface of actuator button assembly 32, coil spring 46 is compressed between the inside surface of actuator button assembly 32 and the outside surface of housing 11. Pressure bar 34 is thus forced out of contact with deformable valve member 12 and valve fluid passageway 18, relieved of this deforming pressure and because of the memory inherent in the elastomeric material, opens up, allowing fluid to be drawn from an reservoir attached from other source of fluid to fluid discharge orifice 30.

The fluid control device of the present invention may also, in different use contexts, be actuated by other or mechanical, or even electromechanical means. Manual or automatic actuation of the valve is also feasible.

Figure 2:
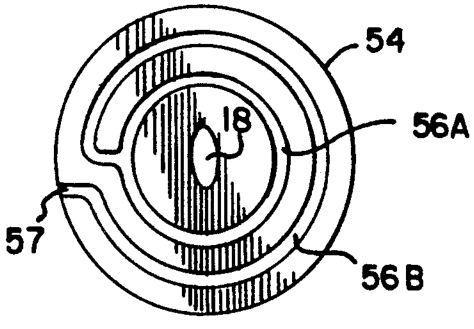
FIG. 2 is a bottom plan view of the deformable member of the valve assembly.

As shown in FIG. 2, in the preferred embodiment of the invention, valve base bottom 54 of valve base 16 has formed therein tortuous path air access channel "56", which is made up of joined inner circular air access channel portion 56A, and outer circular air access channel portion 56B, which extends to the outer perimeter of valve base 16 of deformable valve member 12 at air channel peripheral opening 57. The channel configuration has two purposes: the basic reason for the existence of tortuous path air access channel "56" is to allow atmospheric air to reach corresponding vent hole 58 in the top of plug 59, which rests within reservoir neck 55 of fluid reservoir 50 or other fluid source to which the fluid control valve is attached, to allow for pressure equalization within reservoir as fluid is pumped from the reservoir. The purpose of the configuration of inner circular air access channel portion 56A is to allow vent hole 58 on fluid reservoir 50 to be open to and in open communication with inner circular air access channel portion 56A regardless of the radial orientation of vent hole upon the top of plug 59, which rests within reservoir neck 55 of fluid reservoir 50. Outer circular air access channel portion 56B prevents liquid from leaking from the vent hole of an attached fluid-filled reservoir should the fluid reservoir with the fluid control valve assembly attached be placed on its side. In other embodiments or contexts of use of the fluid control valve of the present invention, the particular configuration of the means for air access and pressure equalization will obviously differ.

Figure 3:
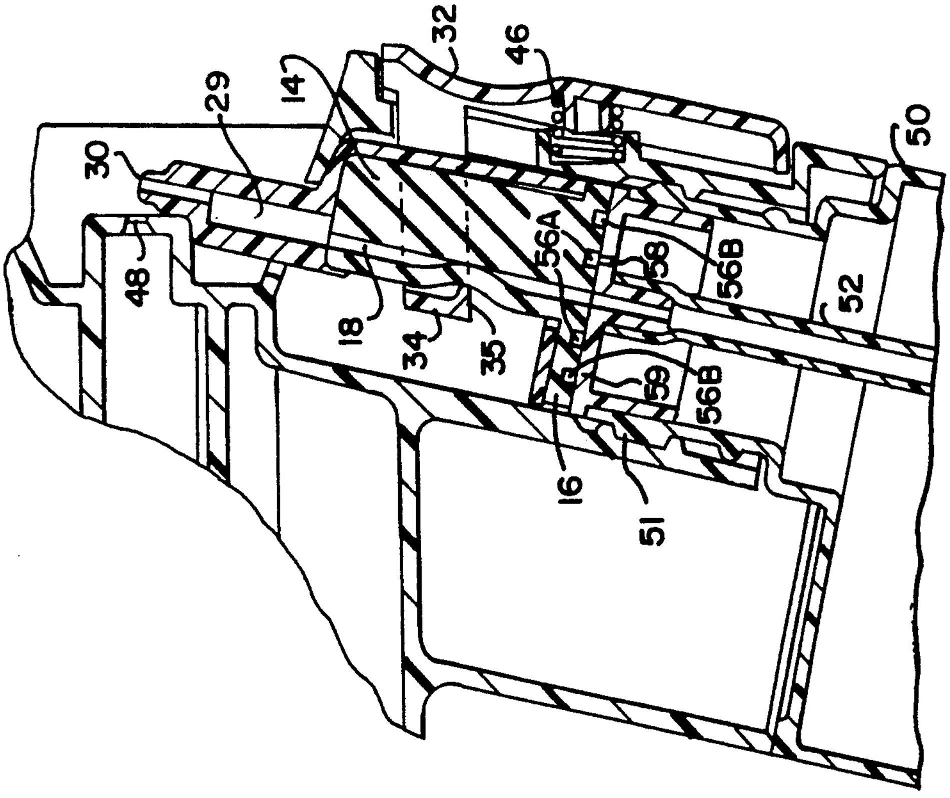
FIG. 3 is a side sectional view the valve assembly in the closed position.

FIG. 3 shows a side sectional view of fluid control valve 10 in the "closed" or non-actuated position, with valve fluid passageway 18 of deformable valve member 12 pinched closed by the pressure exerted by pressure point 35 of pressure bar 34 as actuator button assembly 32 is biased away from housing 11 by coil spring 46.

Figure 4:
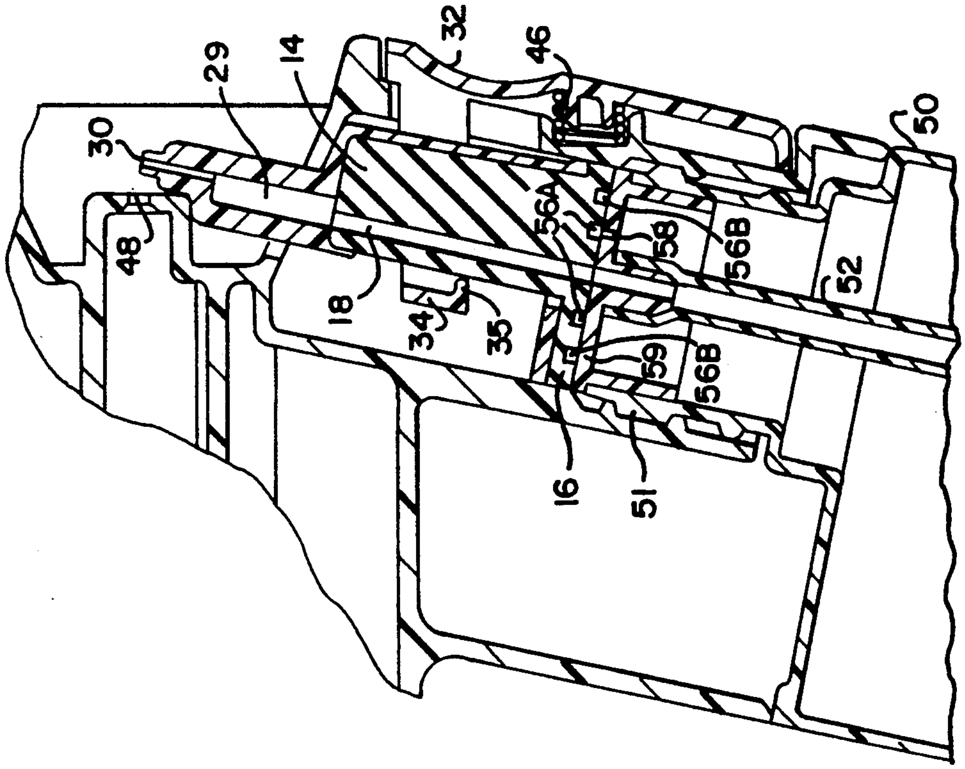
FIG. 4 is a side sectional view the valve assembly in the open position.

FIG. 4 shows a side sectional view of fluid control valve 10 in the "open" position, with valve fluid passageway 18 relieved of the pressure by pressure bar 34. In this position, the user has applied pressure to the exterior of actuator button assembly 32, compressing coil spring 46 between the outer surface of housing 11 and inner surface of actuator button assembly 32. This compression of coil spring 46 allows actuator button assembly 32 to be positioned closer to the surface of housing 11.

In the environment of use depicted in FIGS. 3 and 4, fluid discharge orifice 30 is located just below air discharge port 48 formed within housing 11. Fluid is drawn, by air propelled through air discharge port 48, when valve fluid passageway 18 is in the "open" position, through fluid control valve 10 from attached fluid reservoir 50 so through dip tube 52, through valve fluid passageway 18, and up to fluid discharge orifice 30. Fluid is then drawn into the airstream emerging from air discharge port 48 and a fluid-air spray produced.

Also shown in FIGS. 3 and 4 is the manner in which, in this environment of use, neck plug 59 is held in sealing engagement against valve bottom base 54 of valve base 16. Male screw threads structure 51 are formed into reservoir neck 55 of fluid reservoir 50. Male screw thread structure 51 mates with female screw thread structure 53 formed into the structure of the fluid spraying device which is the actual environment of use partially illustrated by these figures. In other environments of use, the configuration of the means by which the two parts are brought into sealing engagement will differ.

Figure 5:
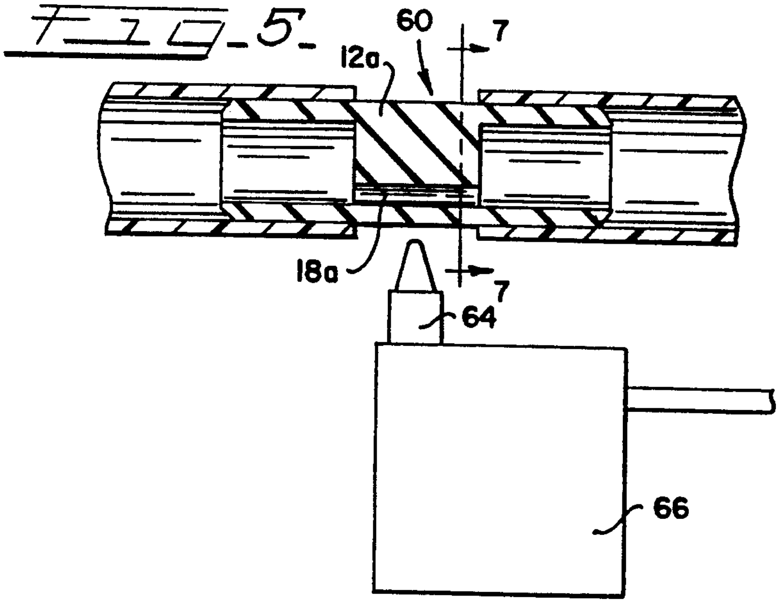
FIG. 5 is a side sectional view of a second embodiment of the valve assembly in the open position.
Figure 6:
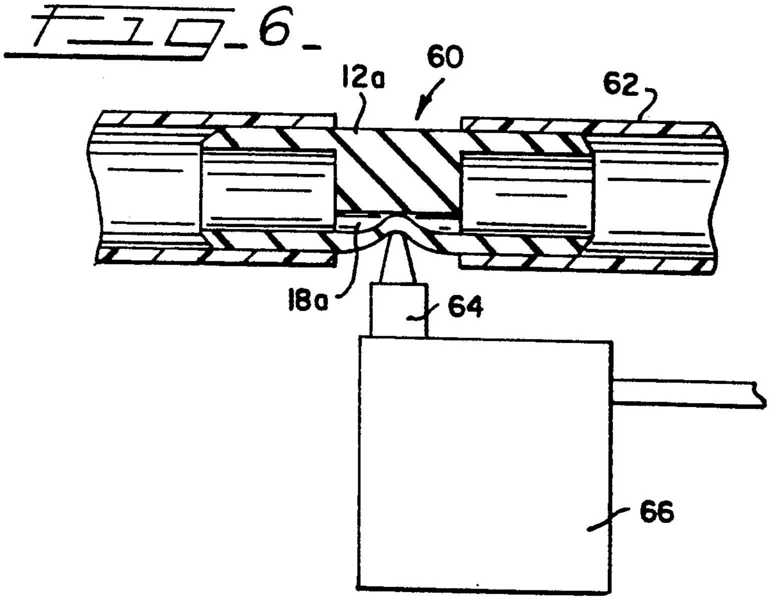
FIG. 6 is a side sectional view of a second embodiment of the valve assembly in the closed position.
Figure 7:
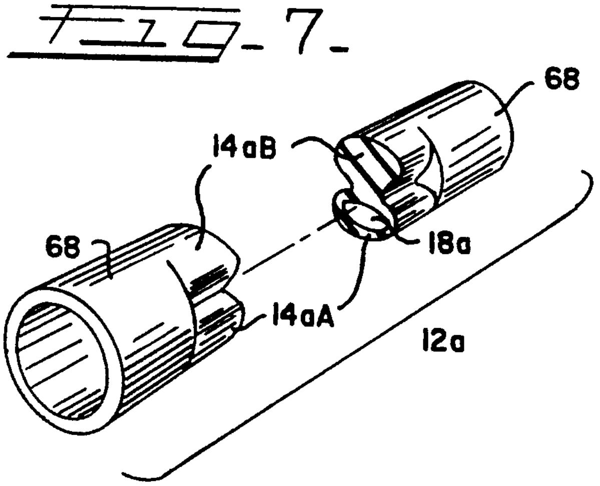
FIG. 7 is an exploded and cross-sectioned perspective view of the deformable valve member of the second embodiment of the valve assembly, the section being taken along line 7—7 of FIG. 5.

FIGS. 5–7 depict a second embodiment of the invention. In this embodiment, deformable valve member 12*a* is placed within gap 60 in tube or pipe 62. Pressure tip 64, which is controlled by electromechanical device 66, moves linearly and reversibly to exert pressure upon or remove pressure from deformable valve member 12*a*. When electromechanical device 66 is actuated, pressure tip 64 moves from its resting position (shown in FIG. 5), in which fluid passageway 18 of deformable valve member 12*a* remains open, to its actuated position (shown in FIG. 6), in which fluid passageway 18*a* of deformable valve member 12*a* is deformed to a closed position.

In this embodiment of the invention (as shown in FIG. 7), deformable valve member 12*a* has a mid-section configuration identical to that in the first embodiment of the invention—with valve fluid passageway 18 having an oval-shaped cross section and first elongated valve body portion 14aA and second elongated valve body portion 14aB. Deformable valve member 12*a*, in this embodiment, has, at either end, connector sections 68 which are designed and sized to fit within and be in fluid communication with tube 62. The size and shape of connector sections 68 will depend upon the intended environment of use of fluid control valve 10. Similarly, gap 60, which, in this embodiment, is a complete interruption of tube 62 may, in other environments of use be differently configured, the only essential element being an access opening to allow pressure tip 64 to exert pressure on deformable valve member.

Figure 8:
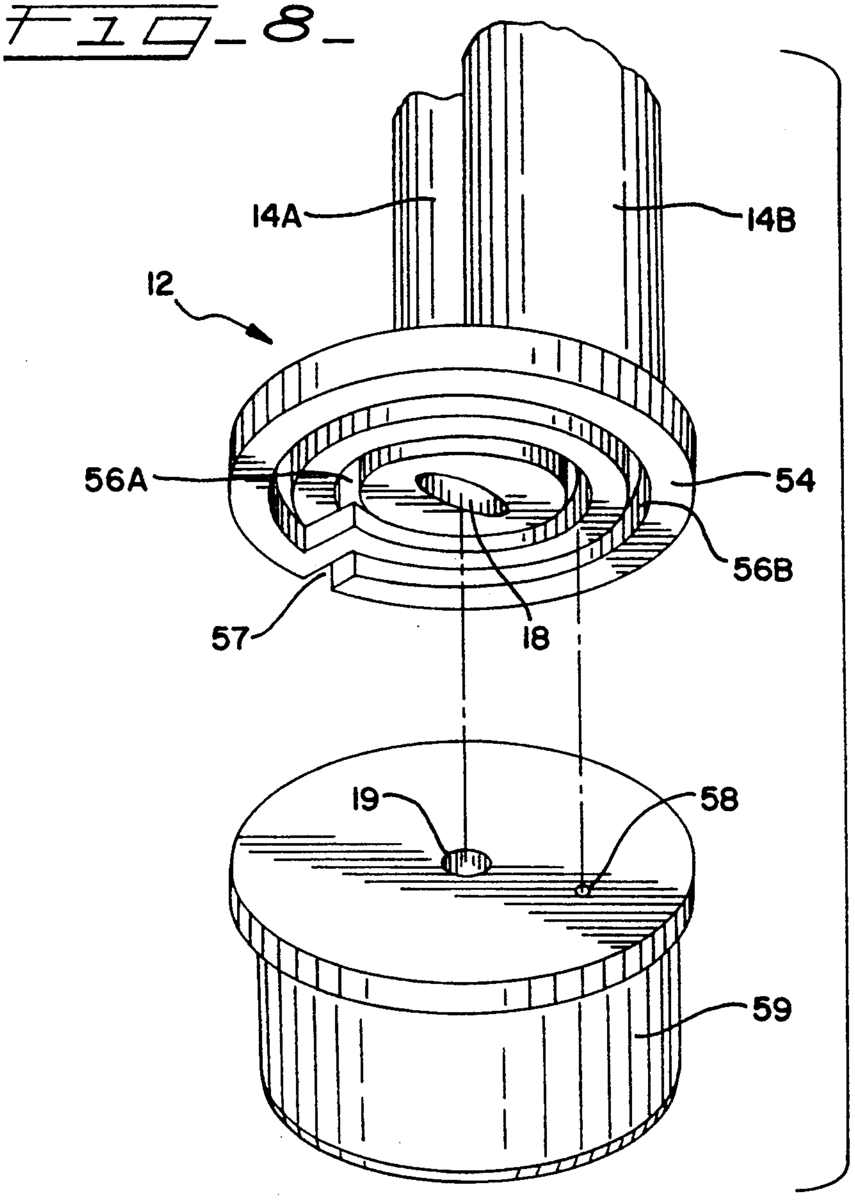
FIG. 8 is a perspective drawing of a neck plug for a reservoir and, slightly backwardly angled so that the bottom of the base is visible, the deformable valve member of the valve assembly.

FIG. 8 shows the manner in which deformable valve member 12 and reservoir neck plug 59 fit together.

Deformable valve member 12 has, passing through the first elongated valve body portion 14A, valve fluid passageway 18. The lower opening of valve fluid passageway 18, when fluid control valve 10 is fitted against neck plug 59, is in open fluid communication, through neck top plug 19 opening, with the fluid contents of a fluid containing reservoir into which neck plug 59 has been, in use, fitted. Neck plug 59 also has through its top surface vent hole 58. Vent hole 58 aligns with and opens into inner circular air access channel portion 56A of tortuous path air access channel 56. This alignment, along a circular path, allows vent hole 58 to open into inner circular air access channel portion 56A regardless of the exact degree of rotation of the fluid reservoir with its attached neck plug 59 relative to fluid control valve 10.

In a preferred environment of use, such as the manually operated pump-type sprayer discussed earlier, neck plug 59 would fit into the neck of a fluid reservoir.

As fluid is withdrawn from the reservoir by the action of the pump, ambient air would enter air channel peripheral opening 57 of tortuous path air access channel 56 and enter the interior of the reservoir through surface vent hole 58, thus maintaining pressure equilibrium between the ambient atmosphere and the interior of the reservoir.

If the joined fluid reservoir and fluid control valve 10 are placed in a horizontal position, fluid from the reservoir may leak out of surface vent hole 58, but its only outlet will be into tortuous path air access channel 56, which, regardless of the orientation of the reservoir, will have two segments oriented at right angles upwardly from fluid reservoir 50, thus effectively preventing fluid leakage from the reservoir. Other modifications of the fluid spray device of the present invention will become apparent to those skilled in the art from an examination of the above patent specification and drawings. Therefore, other variations of the present invention may be made which fall within the scope of the following claims even though such variations were not specifically discussed above.

INDUSTRIAL APPLICABILITY

One embodiment of the valve of the present invention is intended for use in a manually operable and manually actuated fluid spraying device. However, the valve can be used to control fluid flow in other contexts, such as in other small appliances, fluid control devices such as mechanical and laboratory devices and, in general, low-pressure flow industrial applications. Actuation may be manual, mechanical, or electromechanical.

What is claimed is:

1. In a fluid control valve of the type designed to allow fluid to be transferred from a fluid reservoir to a dispensing nozzle, the fluid control valve having a top portion containing a fluid passageway and a base portion through which the fluid passageway extends, the base portion being designed to fit and be held in sealing engagement against a neck plug placed within the neck of the fluid reservoir, the fluid reservoir having a neck portion and a body portion, an air inlet channel in the base portion of the fluid control valve, the air inlet channel being designed to allow air to enter the neck plug of the fluid reservoir and thus equalized the pressure between the atmosphere and the interior of the fluid reservoir when fluid is drawn from the fluid reservoir into the fluid control valve, while preventing fluid from leaking from the fluid reservoir should the fluid reservoir be placed on its side, the air inlet channel having an inner circular channel portion designed to overlie and be in open communication with an air vent opening in the neck plug of the fluid reservoir, and a tortuous path air channel portion leading from the inner circular air channel portion to the periphery of the base portion of the fluid control valve.

2. In a fluid control valve of the type designed to allow fluid to be transferred from a fluid reservoir to a dispensing nozzle, the fluid control valve having a deformable valve member with a top portion and a base portion, the base portion of the deformable valve member designed to fit and be held in sealing engagement against a neck plug placed within the neck of the fluid reservoir, and a means for controlling the flow of fluid through the fluid passageway, the fluid passageway extending through both top and base portions of the deformable valve member, the fluid reservoir having a neck portion and a body portion, an air inlet channel in the base portion of the fluid control valve, the air inlet channel being designed to allow air to enter the neck plug of the fluid reservoir and thus equalize the pressure between the atmosphere and the interior of the fluid reservoir when fluid is drawn from the fluid reservoir into the fluid control valve while preventing fluid from leaking from the fluid reservoir should the fluid reservoir be placed on its side, the air inlet channel having an inner circular channel portion designed to overlie and be in open communication with an air vent opening in the neck plug of the fluid reservoir, and a tortuous path air channel portion leading from the inner circular air channel portion to the periphery of the base portion of the fluid control valve.

3. A fluid control valve comprising a deformable valve member with a fluid passageway therethrough, and means for controlling the flow of fluid through the fluid passageway, the deformable valve member comprising two elongated body portions, a first valve body portion which has a fluid passageway having an oval shaped passageway therethrough, and a second valve body portion which lies parallel to the first valve body portion and serves to add resiliency to any deformation created in the first body portion, and the means for controlling the flow of fluid through the fluid passageway further comprising a coil spring member for biasing a pressure-exerting member against the first valve body portion of the deformable valve member so that the fluid passageway of the deformable valve member is deformed to a first or closed position, in which it exerts a positive pressure upon the deformable valve member and deforms the fluid passageway to a closed position, until the coil spring biasing member is actuated allowing the fluid passageway to assume a second or open position in which the pressure-exerting member exerts no positive pressure upon the deformable valve member so that the fluid passageway remains open, the fluid control valve further comprising a housing which contains the valve and an actuator button for the valve, the actuator button being located upon the exterior of the housing, the coil spring biasing member located between and attached to the housing and the actuator button, the means for controlling the flow of fluid through the fluid passageway further comprising a pressure bar attached to and extending outwardly from the actuator button, the pressure bar extending into the interior of the housing of the fluid control valve through a pressure bar slot, the deformable valve member being located within the housing and oriented so that the first valve body portion, which contains the fluid passageway, adjacent to the pressure bar, the actuator button being located upon the exterior of the housing, and located between the exterior surface of the housing and the interior surface of the actuator button, so that the pressure bar attached to the actuator button is biased against the first valve body portion in the first position, with the fluid passageway closed, and pressure exerted on the actuator button compresses the spring and moves the pressure bar to the second position, which allows the fluid passageway to open, the deformable valve member having a base portion designed to fit and be held in sealing engagement against a fluid source, the base portion further having an air inlet channel in the base portion, the channel being designed to allow air to enter the neck plug of the fluid source which is attached to the fluid control valve and to equalize the pressure between the atmosphere and the interior of the fluid source when fluid is drawn from the fluid source into the fluid control valve, while preventing fluid from leaking from the fluid reservoir should the fluid reservoir be placed on its side, the air inlet channel having an inner circular channel portion designed to overlie and be in open communication with an air vent opening in the neck plug of the fluid reservoir and a tortuous path channel portion leading from the inner circular channel portion to the periphery of the base portion of the deformable valve member.

* * * * *